US007131638B2

(12) United States Patent
Kerfoot (10) Patent No.: US 7,131,638 B2
(45) Date of Patent: Nov. 7, 2006

(54) DEEP WELL SPARGING

(76) Inventor: William B. Kerfoot, 49 Ransom Rd., Falmouth, MA (US) 02540

( * ) Notice: Subject to any disclaimer, the term of this patent is extended or adjusted under 35 U.S.C. 154(b) by 0 days.

(21) Appl. No.: 11/146,722

(22) Filed: Jun. 7, 2005

(65) Prior Publication Data

US 2005/0242449 A1    Nov. 3, 2005

Related U.S. Application Data

(62) Division of application No. 10/365,027, filed on Feb. 12, 2003, now Pat. No. 6,913,251.

(51) Int. Cl.
*B01F 3/04* (2006.01)
(52) U.S. Cl. .............. 261/16; 261/30; 261/77; 261/105; 261/122.1; 210/760; 210/198.1
(58) Field of Classification Search .......... 210/170, 210/192, 198.1, 199, 205, 209, 221.1, 283, 210/484, 747, 759, 760, 763; 422/181; 261/16, 261/30, 77, 105, 122.1, 122.2, 124, DIG. 42, 261/DIG. 70, DIG. 75
See application file for complete search history.

(56) References Cited

U.S. PATENT DOCUMENTS

| 5,620,593 | A | * | 4/1997 | Stagner | 210/90 |
| 5,855,775 | A | * | 1/1999 | Kerfoot | 210/170 |
| 5,879,108 | A | * | 3/1999 | Haddad | 405/128.45 |
| 6,083,407 | A | * | 7/2000 | Kerfoot | 210/747 |
| 6,284,143 | B1 | * | 9/2001 | Kerfoot | 210/747 |
| 6,312,605 | B1 | * | 11/2001 | Kerfoot | 210/741 |
| 6,436,285 | B1 | * | 8/2002 | Kerfoot | 210/199 |
| 6,447,676 | B1 | * | 9/2002 | Kerfoot | 210/170 |
| 6,582,611 | B1 | * | 6/2003 | Kerfoot | 210/747 |
| 6,596,161 | B1 | * | 7/2003 | Kerfoot | 210/199 |
| 6,805,798 | B1 | * | 10/2004 | Kerfoot | 210/620 |

\* cited by examiner

*Primary Examiner*—Scott Bushey
(74) *Attorney, Agent, or Firm*—Fish & Richardson P.C.

(57) ABSTRACT

Method and apparatus for treating contaminants on a site, especially a deep well site includes delivering a first stream of a first gas to a first port of a laminar microporous diffuser and delivering a second stream of a second gas to a second port of the laminar microporous diffuser to effect mixing of the first and second streams of gases within the laminar microporous diffuser.

29 Claims, 5 Drawing Sheets

DEEP WELL SPARGING

RELATED APPLICATIONS

This application is a Divisional application of Ser. No. 10/1365,027, filed Feb. 12, 2003, now U.S. Pat. No. 6,913,251.

BACKGROUND

This invention relates generally to water remediation systems.

There is a well-recognized need to clean-up contaminants found in ground water, i.e., aquifers and surrounding soil formations. Such aquifers and surrounding soil formations may be contaminated with various constituents including organic compounds such as, volatile hydrocarbons, including chlorinated hydrocarbons such as dichloroethene (DCE), trichloroethene (TCE), and tetrachloroethene (PCE). Other contaminates that can be present include vinyl chloride, 1,1 trichloroethane (TCA), and very soluble gasoline additives such as methyl tertiary butyl ether (MTBE). At times these contaminants and others are found at great depths below the earth's surface. Other contaminants may also be encountered.

SUMMARY

According to an aspect of this invention, a method includes delivering a first stream of a first gas to a first port of a laminar microporous diffuser and delivering a second stream of a second gas to a second port of the laminar microporous diffuser to effect mixing of the first and second streams of gases within the laminar microporous diffuser.

The following embodiments are within the scope of the invention. The laminar microporous diffuser includes a first elongated member including at least one sidewall having a plurality of microscopic openings, said sidewall defining an interior hollow portion of said member and coupled to the first inlet port, a second elongated member having a second sidewall having a plurality of microscopic openings, said second member being disposed through the interior hollow region defined by the first member and coupled to the second inlet port and an end cap to seal a first end of the microporous diffuser.

The first and second elongated members are cylinders and the second elongated member is disposed concentric to the first elongated member. The second elongated member is one of a plurality of second elongated members disposed through the first elongated member. The plurality of second elongated members are disposed through a substantial portion of a length of the first elongated member, with the second elongated members including caps to terminate ends of the second elongated members.

In some embodiments an ozone generator is coupled to the first inlet. The ozone generator and a pump to supply air are arranged so that the ozone generator works under a siphon condition to efficiently deliver ozone to the microporous diffuser. The microporous diffuser is disposed in a well at a depth exceeding a depth that produces a back pressure on an ozone generator that would effectively reduce the efficiency of ozone production by the ozone generator by 50%. The the microporous diffuser emits microbubbles having a size in a range of 1 to 200 microns. The microporous diffuser is disposed at a vertical depth in excess of 180 feet from the surface of the earth.

According to a further aspect of this invention, an apparatus includes a well, a first pump to deliver a first stream of gas, a second pump to deliver a second stream of gas and a laminar microporous diffuser disposed in the well, the laminar microporous diffuser having a top cap with first and second inlet ports coupled to the first and second pumps. The laminar microporous diffuser includes a first elongated member forming one sidewall having a plurality of microscopic openings, said sidewall defining an interior hollow portion of the first member with the interior portion coupled to the first inlet port, a second elongated member forming a second sidewall having a plurality of microscopic openings, said second member defining a second interior portion and being disposed through the hollow region of said first member, with the second interior portion being coupled to the second inlet port, and an end cap to seal a second end of the laminar microporous diffuser with the first pump delivering the first gas stream to peripheral portions of the laminar microporous diffuser and the second pump delivering the second stream of gas to central portions of the laminar microporous diffuser, with the second stream of gas migrating to peripheral portions of the laminar microporous diffuser to effect mixing of the first and second streams of gases within the laminar microporous diffuser.

Other embodiments include an ozone generator coupled to the first port and wherein the first gas is ozone and the second gas is air. The first and second elongated members are cylinders and the second elongated member is disposed concentric to the first elongated member. The second elongated member is one of a plurality of second elongated members disposed through the first elongated member. The plurality of second elongated members are disposed through a substantial portion of a length of the first elongated member, and with the second elongated members including caps to terminate ends of the second elongated members.

The ozone generator and pump to supply air are arranged so that the ozone generator works under a siphon condition to efficiently deliver ozone to the microporous diffusers. The apparatus of claim wherein the microporous diffuser is disposed in the well at a depth exceeding a depth that produces a backpressure on the ozone generator that would effectively reduce by 50% the efficiency of ozone production by the ozone generator. The microporous diffuser emits microbubbles having a size in a range of 0.5 to 200 microns, more specifically from about 1 micron to 100 microns.

According to a still further aspect of this invention, apparatus includes a first pump to deliver a first stream of gas, a second pump to deliver a second stream of gas, a laminar microporous diffuser coupled to the first and second pumps, the laminar microporous diffuser including a top cap with first and second inlet ports, the laminar microporous diffuser having an interior hollow portion coupled to the first inlet port and a second interior portion disposed through the first hollow portion, with the second interior portion being coupled to the second inlet port and an end cap to seal a second end of the laminar microporous diffuser with the first pump delivering the first gas stream to peripheral portions of the laminar microporous diffuser and the second pump delivering the second stream of gas to central portions of the laminar microporous diffuser, with the second stream of gas migrating to peripheral portions of the laminar microporous diffuser to effect mixing of the first and second streams of gases within the laminar microporous diffuser.

Other embodiments include an ozone generator coupled to the first pump and wherein the first gas is ozone and the second gas is air. The ozone generator and the pump to supply air are arranged so that the ozone generator works under a siphon condition to efficiently deliver ozone to the microporous diffusers. The microporous diffuser emits microbubbles having a size in a range of 1 to 200 microns.

One or more advantages can be provided from the above. The ozone generator and pump to supply air are arranged so that the ozone generator works under a siphon condition to efficiently deliver ozone to the microporous diffusers. This permits the microporous diffuser bo be disposed in a well at a depth exceeding a depth that produces a backpressure on the ozone generator that would effectively reduce the efficiency of ozone production by the ozone generator.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
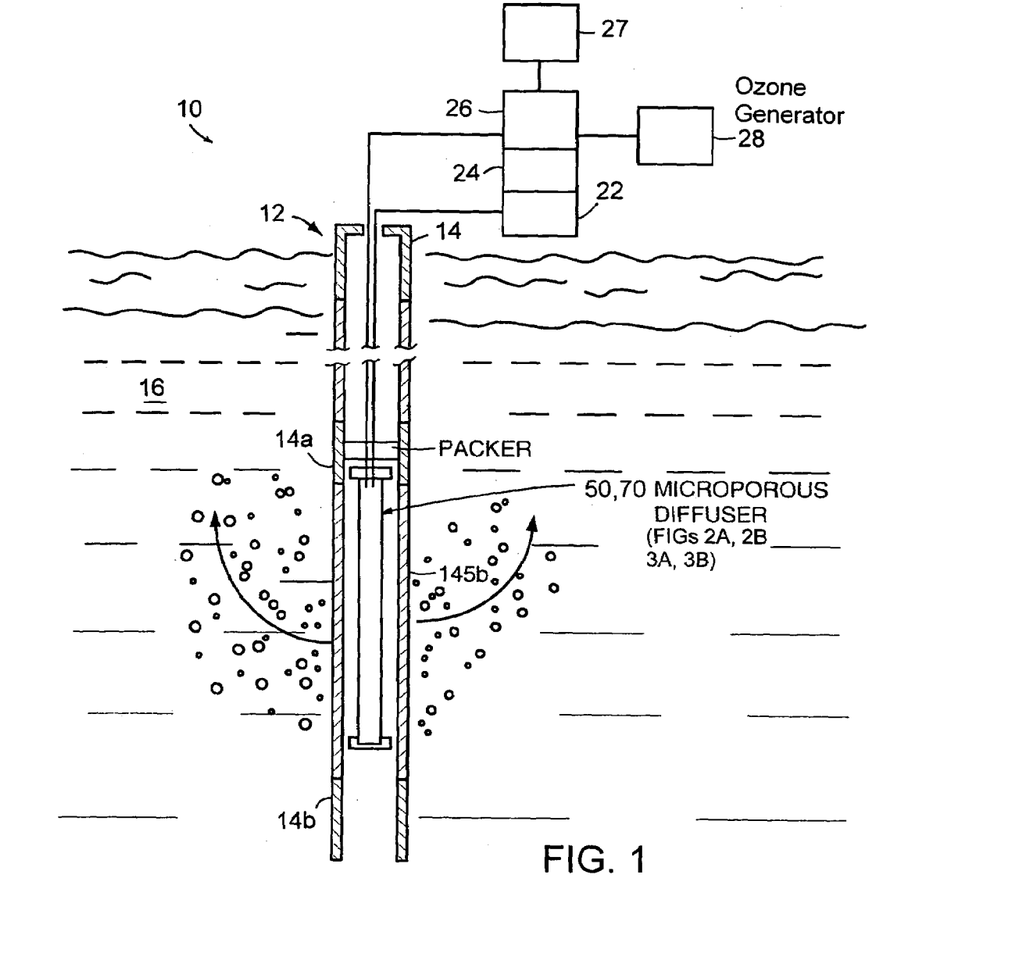
FIG. 1 is a cross-sectional view showing a sparging treatment example, adapted for sparging at great depths below the surface of the earth.

Referring now to FIG. 1, a sparging arrangement 10 for treating plumes, sources, deposits or occurrences of contaminants, is shown. The arrangement 10 is disposed in a well 12 that has a casing 14 with an inlet screen 14a and outlet screen 14b to promote a re-circulation of water into the casing 14 and through the surrounding ground/aquifer region 16. The casing 14 supports the ground about the well 12. Generally, the well 12 is deep, e.g., beyond 200 feet or so, but can be a shallow well, e.g., less than 200 feet or so. Disposed through the casing 14 are one or more microporous diffusers, e.g., 50 or 70 (discussed in FIGS. 2A–2B or 3A–3B). The arrangement 10 also includes a first air compressor/pump 22 and a compressor/pump control mechanism 24 to feed air into the microporous diffuser, and a second pump 26 and control 27 coupled to an ozone (O3) generator 28 to feed a separate feed of ozone to the microporous diffuser. The compressor/pump 22 feeds a stream of air into the microporous diffuser 50 or 70 whereas; the second pump 26 feeds a stream of ozone (O3) from the ozone generator 28 into microporous diffuser 50 or 70. Exiting from walls of the microporous diffuser 50 or 70 are microbubbles of air and ozone. Such encapsulated micron size bubbles of air/ozone affect substantial removal of below-mentioned or similar types of contaminants. The arrangement 10 can also include a pump (not shown) that supplies nutrients such as catalyst agents including iron containing compounds such as iron silicates or palladium containing compounds such as palladized carbon. In addition, other materials such as platinum may also be used.

The arrangement 10 makes use of laminar microporous diffusers 50, 70. The laminar microporous diffusers 50, 70 allow introduction of multiple gas streams. The laminar microporous diffusers 50, 70 have at least two inlets. At least one of the inlets introduces a first gas stream about the periphery of the laminar microporous diffusers 50, 70 and another inlet introduces a second gas stream within interior regions of the laminar microporous diffusers 50, 70. The gas streams can be the same gas or preferably are different. In the embodiment described, the first gas stream is ozone and the second is air. This allows the ozone generator 28 to work under a siphon condition rather than requiring a high back pressure condition in order to efficiently deliver ozone and produce micron size bubbles of air/ozone at great depths in the well 12. With the ozone generator under a siphon condition is advantageous for operation of the ozone generator at optimal efficiency and delivery of optimal amounts of ozone into the well, especially if the ozone generator is a corona discharge type. The pump 22 feeds an air stream and induces a negative pressure on the ozone stream that is fed from pump 26 when both streams are fed through the microporous diffusers 50, 70.

In particular, with the microporous diffusers 50 and 70 and use of an outer port to introduce a stream of ozone, the microbubbles are produced in the microporous diffuser by bubbling air through a central cylinder of the microporous diffusers and into the surrounding outer regions of the microporous diffusers where it is mixed with the ozone. This arrangement thus can be used to treat deposits of contaminants. While it can treat shallow deposits it is especially useful to treat deposits that are deep into the earth's surface since by producing a negative pressure it allows the ozone stream to overcome the backpressure in the well, without requiring the ozone generator to work under high back pressure conditions. Corona type ozone generators tend to lose efficiency when operated at high backpressures. For instance, doubling of pressure in the ozone generator to overcome large backpressures can result in an effective reduction by 75% in ozone production compared to what the ozone generator could produce at ambient pressure conditions. Under this arrangement ozone can be supplied at a flow rate of for example, 0.5–50 cubic feet per hour (CFH) of ozone and 2 to 20 cubic feet per minute of air. An exemplary set of rates is for 2-inch wells 3–5 CFM total gas (air and ozone) with ozone being $\frac{1}{20}^{th}$ to $\frac{1}{100}^{th}$ of the total volume.

The fine bubbles promote rapid gas/gas/water reactions with volatile organic compounds, in which a substrate (catalyst or enhancer) participates in, instead of solely enhancing dissolved (aqueous) disassociation and reactions. The production of microbubbles and selection of appropriate size distribution is provided by using microporous material and a bubble chamber for optimizing gaseous exchange through high surface area to volume ratio and long residence time within the liquid to be treated. The equipment promotes the continuous production of microbubbles while minimizing coalescing or adhesion.

The injected air/ozone combination moves as a fluid into the material to be treated. The use of microencapsulated ozone enhances and promotes in-situ stripping of volatile organics and simultaneously terminates the normal reversible Henry s reaction. The process involves promoting simultaneous volatile organic compounds (VOC) in-situ stripping and gaseous decomposition, with moisture (water) and substrate (catalyst or enhancer). The basic chemical reaction mechanism of air/ozone encapsulated in microfine bubbles is further described in several of my issued patents such as U.S. Pat. No. 5,855,775, US patent all of which are incorporated herein by reference.

The compounds commonly treated are HVOCs (halogenated volatile organic compounds), PCE, TCE, DCE, vinyl chloride (VC), EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, CO2 and H2O accomplishes this. In the case of petroleum products like BTEX (benzene, toluene, ethylbenzene, and xylenes), the benzene entering the bubbles reacts to decompose to CO2 and H2O.

Also, pseudo Criegee reactions with the substrate and ozone appear effective in reducing saturated olefins like trichloro alkanes (1,1,1,-TCA), carbon tetrachloride ($CCl_4$), chloroform methyl chloride, and chlorobenzene, for instance.

Other contaminants that can be treated or removed include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed including chloroalkanes, including 1,1,1 trichloroethane, 1,1, dichloroethane, methylene chloride, and chloroform. Also, aromatic ring compounds such as oxygenates such as O-xylene, P-xylene, naphthalene and methyltetrabutylether (MTBE), ethyltetrabutylether, and tertiaryamyltylether can be treated.

Ozone is an effective oxidant used for the breakdown of organic compounds in water treatment. The major problem in effectiveness is that ozone has a short lifetime. If ozone is mixed with sewage containing water above ground, the half-life is normally minutes. Ozone reacts quantitatively with PCE to yield breakdown products of hydrochloric acid, carbon dioxide, and water.

To offset the short life span, the ozone is injected with microporous diffusers, enhancing the selectiveness of action of the ozone. By encapsulating the ozone in fine bubbles, the bubbles would preferentially extract a vapor phase fraction of the volatile compounds organic compounds they encountered. With this process, a vapor phase according to a partition governed by Henry's Law, of the volatile organics are selectively pulled into the fine air-ozone bubbles. The gas that enters a small bubble of volume ($4\pi r3$) increases until reaching an asymptotic value of saturation. The ozone in the bubbles attacks the volatile organics, generally by a Criegee or Criegee like reaction.

The following characteristics of the contaminants appear desirable for reaction:

| | |
|---|---|
| Henry s Constant: | 10-2 to 10-4 m3 atm/mol |
| Solubility: | 10 to 20,000 mg/l |
| Vapor pressure: | 1 to 3000 mmhg |
| Saturation concentration: | 5 to 9000 g/m3 |

The production of microbubbles and selection of appropriate size distribution are selected for optimized gas exchange through high surface area to volume ratio and long residence time within the area to be treated. The microbubbles are generated by using microporous materials in the microporous diffuser 50 that acts as a bubble chamber, as shown in the embodiment 50 (FIGS. 3A–3B) or, alternatively, through the embodiment 70 of the microporous diffuser of FIGS. 4A–4B.

Figure 2A:
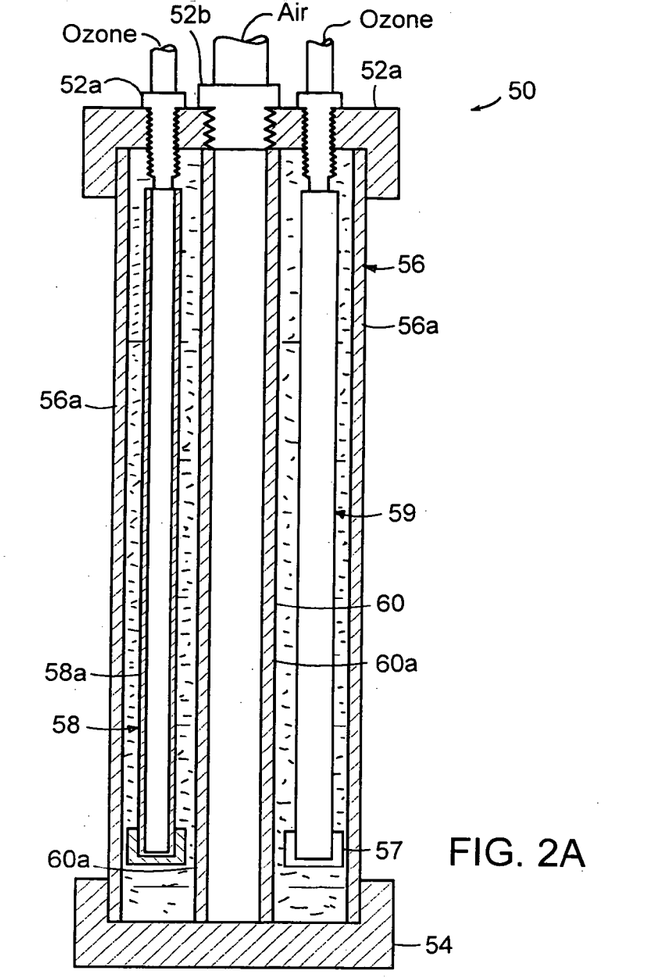
FIGS. 2A and 2B are longitudinal cross-section and plan cross-sectional views of a microporous diffuser useful in the arrangement of FIG. 1.
Figure 2B:
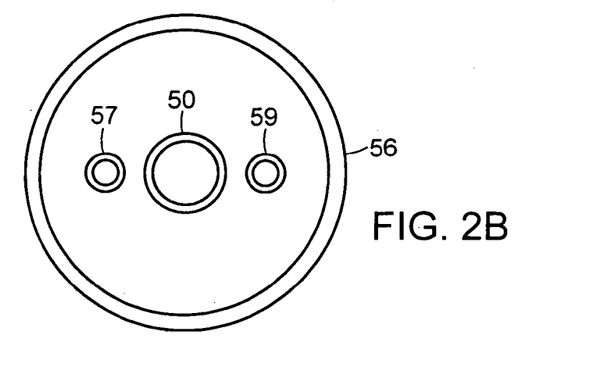

Referring now to FIGS. 2A–2B, a microporous diffuser 50 is shown. The microporous diffuser 50 includes a first cylindrical member 56 comprised of a hydrophobic material that provides an outer cylindrical shell for the microporous diffuser 50. The cylindrical member 56 has a sidewall 56a comprised of a large plurality of micropores. A second cylindrical member 60 is coaxially disposed within the first cylindrical member 56. The second cylindrical member 60 is comprised of a hydrophobic material and has a sidewall 60a comprised of a large plurality of micropores. Also disposed within the confines of the first cylindrical member 56 are a plurality of cylindrical members 58, here four, which have sidewalls 58a having a large plurality of micropores and also comprised of a hydrophobic material.

Proximate ends of the plurality of cylindrical members 58 are coupled to first inlet ports generally denoted as 52a and a proximate end of central cylindrical member 60 is coupled to a second inlet port 52b which is provided with inlet cap 52. In the disclosed embodiment ozone is fed to the first inlet ports 52a and air is fed to the second inlet port 52b. At the opposite end of the microporous diffuser 50 an end cap 54 covers distal ends of cylindrical members 56 and 60. Here distal ends of the plurality of cylindrical members 58 are sealed by separate caps 59 but could be terminated by the end cap 54. The end cap 54 in conjunction with cap 52 seals the ends of the microporous diffuser. Each of the cylindrical members 56, 58 and 60 are here cylindrical in shape and have a plurality of microscopic openings constructed through sidewalls 56a, 58a and 60a, respectively, thereof having pore sizes matched to or to create a pore size effective for inducing gas/gas reactions. Sidewalls of each of the cylindrical members can have a pore diameter in a range of 1–200 microns, preferably 1–80 microns and more preferably 1–20 microns. The combination of the inlet cap 52 and end cap 54 seals the microporous diffuser 50 permitting liquid and gas to escape by the porous construction of sidewalls of the microporous diffusers.

The microporous diffuser 50 can optionally be filled with a microporous material such as microbeads with mesh sizes from 20 to 200 mesh or sand pack or porous hydrophilic plastic to allow introducing ozone into the pore spaces where ozone is exiting.

Figure 3A:
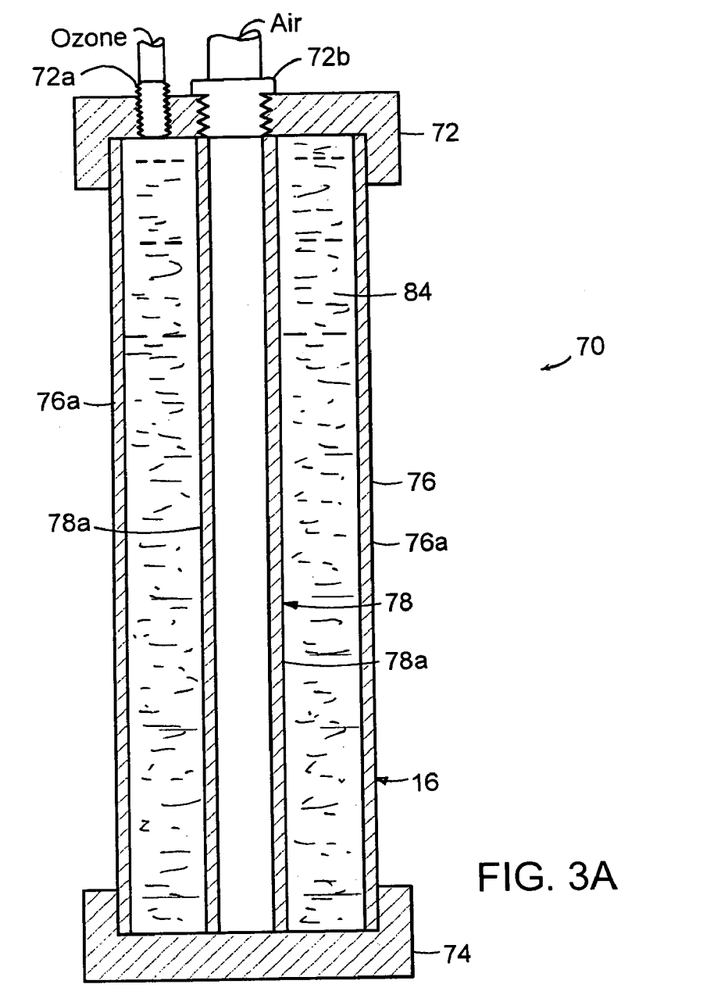
FIGS. 3A and 3B are longitudinal cross-section and plan cross-sectional views, respectively, of an alternative microporous diffuser useful in the arrangement of FIG. 1.
Figure 3B:
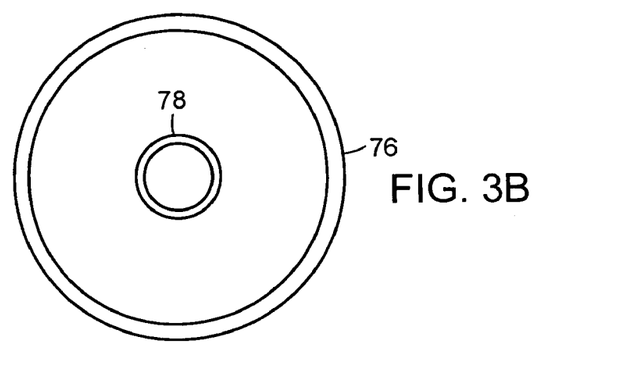

Referring now to FIGS. 3A and 3B, an alternate embodiment 70 of a microporous diffuser is shown. The microporous diffuser 70 includes an outer cylindrical member 76 having a sidewall 76a within which is disposed an inner cylindrical member 78 having a sidewall 78a. The inner cylindrical member 78 is spaced from the sidewall of the outer cylindrical member. The space 77 between the inner and outer cylindrical members 76, 78 is filled with a packing material comprised of glass beads or silica particles (silicon dioxide) or porous plastic which, in general, are hydrophilic in nature. This space is coupled to a first input port 72a which receives a first gas, e.g., ozone from pump 26.

The microporous diffuser 70 has the inner cylindrical member 78 disposed coaxial or concentric to cylindrical member 78. Sidewalls of each of the cylindrical members can have a pore diameter in a range of 1–200 microns, preferably 1–80 microns and more preferably 1–20 microns. A proximate end of the inner cylindrical member is coupled to a second inlet port 72b that is fed the second gas, e.g., air from pump 22. The microporous diffuser also includes an end cap 74 that secures distal ends of the cylinders 76 and 78. The combination of the inlet cap 72 and end cap 74 seals the microporous diffuser permitting liquid and gas to escape by the porous construction of sidewalls of the microporous diffusers.

Figure 4A:
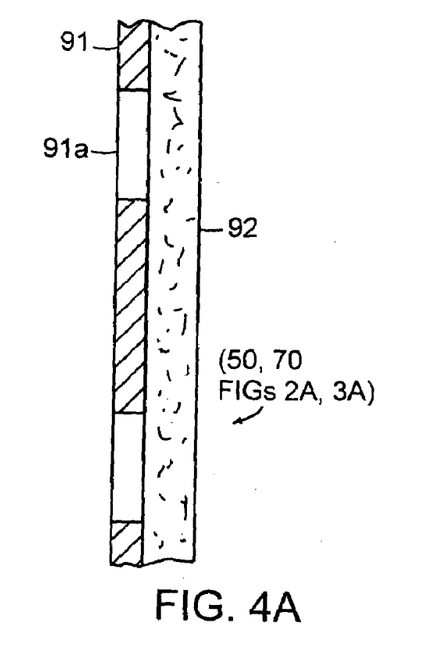
FIGS. 4A and 4B are cross-sectional view of sidewalls of the microporous diffusers of FIG. 2A, 2B or 3A, 3B showing exemplary construction details.
Figure 4B:
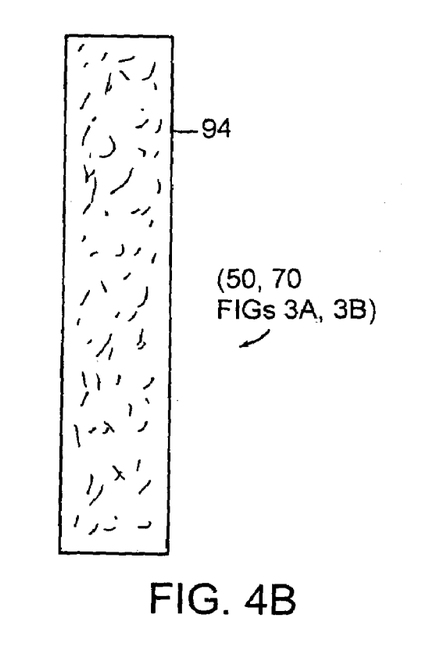

Referring now to FIGS. 4A, 4B, construction details for the elongated cylindrical members for the microporous diffusers 50, 70 are shown. As shown in FIG. 4A, sidewalls of the members can be constructed from a metal or a plastic support layer 91 having large (as shown) or fine perforations 91a over which is disposed a layer of a sintered i.e., heat fused microscopic particles of plastic. The plastic can be any hydrophobic material such as polyvinylchloride, polypropylene, polyethylene, polytetrafluoroethylene, high-density polyethylene (HDPE) and ABS. The support layer 91 can have fine or coarse openings and can be of other types of materials.

FIG. 4B shows an alternative arrangement 94 in which sidewalls of the members are formed of a sintered i.e., heat fused microscopic particles of plastic. The plastic can be any hydrophobic material such as polyvinylchloride, polypropylene, polyethylene, polytetrafluoroethylene, high-density polyethylene (HDPE) and alkylbenzylsulfonate (ABS).

The fittings (i.e., the inlets in FIGS. 2A, 3A can be threaded and are attached to the inlet cap members by epoxy, heat fusion, solvent or welding with heat treatment to remove volatile solvents or other approaches. Standard threading can be used for example NPT (national pipe thread) or box thread e.g., (F480). The fittings thus are securely attached to the microporous diffusers in a manner that insures that the microporous diffusers can handle pressures that are encountered with injecting of the air/ozone.

Figure 5:
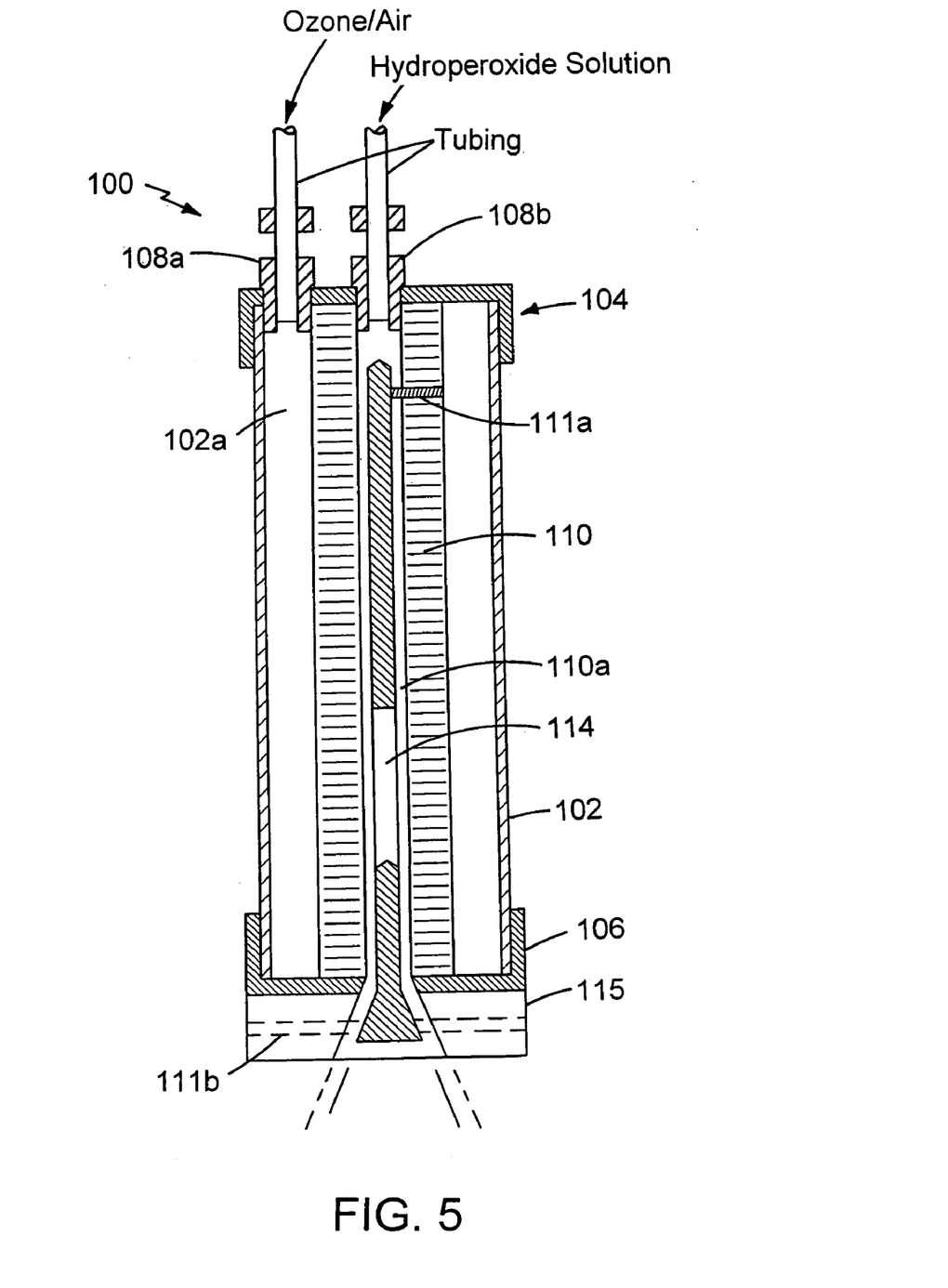
FIG. 5 is a cross-sectional view of a microbubbler useful in the arrangement of FIG. 1

Referring to FIG. 5, an embodiment of a microbubbler 100 is shown. The microbubbler 100 includes an outer cylinder 102 that is secured between a top cap 104 and bottom cap 106. In the top cap 104 a pair of inlets 108a, 108b are disposed. The outer cylinder member 102 defines a first interior chamber 102a that is fed by a first one 108a of the inlets 108a, 108b. The microbubbler 100 also includes an inner cylinder 110 of a microporous material, which defines a second interior chamber 110a. A solid cylindrical insert 114 is disposed within an upper portion of the second interior chamber 110a and is secured in place by a pin 111a that is attached for instance to the microporous material cylinder 110. A nozzle member 116 is disposed within a lower portion of the second interior chamber 110a and is secured in place by a second pin 111b that is attached for instance to a shroud 115 that covers the bottom end cap.

The microbubbler 100 receives a liquid through the inlet 108b that directly couples to a chamber defined by the inner cylinder 110 and propagates through the region about the solid cylindrical insert 114. In some embodiments the liquid can be hydrogen peroxide whereas in others it can be clean water. In a water embodiment, the microbubbler can be used in a pumped water or recirculating water arrangement, where an external source of water or water found inside the well, e.g., in a fractured formation, is recirculated into the microbubbler 100 using a submersible pump or other arrangement (not shown). Gas, e.g., ozone and air are fed through inlet 108a through the cavity or chamber defined by the outer cylinder member 102 the inner cylinder 110 of the microporous material. Pressure of the gas forces the gas out of the cavity through the microporous materials, (e.g., .2 to 200 microns) where the gas (ozone and air) meet the liquid, which forms bubbles of the gas with a coating of the liquid. The solid cylindrical insert 114 and nozzle 116 provides dispersion of the bubbles through the bottom end cap.

In a typical embodiment, tubes that connect to the bubbler 100 can be stainless steel, the outer cylinder is PVC schedule 40, having an inner diameter of 2", the cylinder member 104 has a diameter of 1 inch, and an inner diameter of 0.5 inches, leaving a sidewall of microporous materials 0.25 inches thick.

The microbubbler 100 can be used in conjunction with one or more microporous diffusers 50, 70 in a sparging apparatus of FIG. 1 or a non-laminar microporous diffuser (e.g., one that delivers a single fluid stream), where the application is for a deep well. Alternatively, the microbubbler can be used in a shallower well, e.g., less that 180 ft in depth with or without one or more laminar microporous diffusers 50, 70, or a non-laminar microporous diffuser (e.g., one that delivers a single fluid stream). Alternatively, the microbubbler 100 can be used in place of microporous diffusers. When disposed in a sparging apparatus, a packer (not shown) can be placed generally anywhere along the length of the bubbler 100 provided it is above the shroud and below fittings for the tubing.

The solid cylindrical insert 114 can have a taper starting at about 0.5 inches diameter to fit snuggly into the interior of the second member 104 and taper down to 0.1 to 0.15 inches at the bottom. The length of the microbubbler 100 can be of the order of 0.5 to 5 feet, more preferably 1–2 feet in length. The taper can allow manual adjustment of the solid cylindrical insert 114 within the cavity of the second member 104 to provide an adjustment of the shearing properties of the fluid as it passes over the inner surface of the microporous material and exits the microbubbler 100.

By combining reactants below the surface this microbubbler 100 avoids quenching of reactants during transport and lessens side reactions that can take place with transport tubing and delivery systems. The bubble size of the bubbles can be adjusted by changing the size of the microporous materials and by adjusting the shearing velocities of the liquid that sheers bubbles away from the microporous materials. Also the distribution of the bubbles can be adjusted by pulsing of the gas/liquids.

A number of embodiments of the invention have been described. Nevertheless, it will be understood that various modifications may be made without departing from the spirit and scope of the invention.

What is claimed is:

1. A method comprises:
   delivering a first stream of a first gas to a first port of a microporous diffuser; and
   delivering a second stream of a second gas to a second port of the microporous diffuser to effect mixing of the first and second streams of gases within the microporous diffuser.

2. The method of claim 1 wherein the microporous diffuser comprises:
   a first elongated member including at least one sidewall having a plurality of microscopic openings, said sidewall defining an interior hollow portion of said member and coupled to the first inlet port;
   a second elongated member having a second sidewall having a plurality of microscopic openings, said second member being disposed through the interior hollow region defined by the first member and coupled to the second inlet port;
   an end cap to seal a first end of the microporous diffuser.

3. The method of claim 2 wherein the first and second elongated members are cylinders and the second elongated member is disposed concentric to the first elongated member.

4. The method of claim 2 wherein the second elongated member is one of a plurality of second elongated members disposed through the first elongated member.

5. The method of claim 4 wherein the plurality of second elongated members posed through a substantial portion of a length of the first elongated member, and with the second elongated members including caps to terminate ends of the second elongated members.

6. The method of claim 1 wherein an ozone generator is coupled to the first inlet.

7. The method of claim 6 wherein the ozone generator and a pump to supply air are arranged so that the ozone generator works under a siphon condition to efficiently deliver ozone to the microporous diffuser.

8. The method of claim 1 wherein the microporous diffuser is disposed in the well at a depth that exceeds a depth that produces a back pressure on an ozone generator that would effectively reduce the efficiency of ozone production by the ozone generator by 50%.

9. The method of claim 1 further comprising disposing the microporous diffuser in a well.

10. The method of claim 1 wherein the microporous diffuser emits microbubbles having a size in a range of 1 to 200 microns.

11. The method of claim 1 wherein the microporous diffuser is disposed at a vertical depth in excess of 180 feet from the surface of the earth.

12. A method comprises:
delivering a first stream of a first gas to a first inlet port of a microporous diffuser;
delivering a second stream of a second gas to a second inlet port of the microporous diffuser, with the first inlet port coupling to a first region of the microporous diffuser defined by a first member having a plurality of microscopic openings and a second member having a plurality of microscopic openings, and the second inlet port coupling to a second region of the microporous diffuser defined by the second member, to effect mixing of the first and second streams of gases within the first region of the microporous diffuser.

13. The method of claim 12 wherein the microporous diffuser further comprises:
an end cap to seal a first end of the microporous diffuser.

14. The method of claim 13 wherein the first and second members are cylinders and the second cylindrical member is disposed concentric to the first cylindrical member.

15. The method of claim 13 wherein the second member is one of a plurality of second members disposed through the first member.

16. The method of claim 13 further comprising:
feeding ozone and air to the first and second inlet ports, respectively.

17. The method of claim 13 further comprising:
feeding ozone and air to the first and second inlet ports, respectively, so that a ozone generator that supplies the ozone works under a siphon condition to efficiently deliver ozone to the microporous diffuser.

18. The method of claim 16 wherein the microporous diffuser is disposed in a well at a depth that exceeds a depth that produces a back pressure on an ozone generator that supplies the ozone, the back pressure being sufficient to otherwise reduce the efficiency of ozone production by the ozone generator by 50%.

19. The method of claim 13 further comprising:
disposing the microporous diffuser in a well.

20. The method of claim 13 wherein delivering a first stream of a first gas and delivering a second stream of a second gas provides microbubbles having a size in a range of 1 to 200 microns to be emitted from the microporous diffuser.

21. The method of claim 13 wherein the microporous diffuser is disposed at a vertical depth in excess of 180 feet from the surface of the earth.

22. A method comprises:
emitting microbubbles of air and ozone by:
delivering a first stream of ozone gas from an ozone generator to a first inlet port of a microporous diffuser, the ozone flowing through peripheral regions of the microporous diffuser;
delivering a second stream of air to a second inlet port of the microporous diffuser, the air flowing through central regions of the microporous diffuser and diffusing out towards the peripheral regions of the microporous diffuser, with the flowing air causing the ozone generator to operate under a siphon condition to efficiently deliver the ozone.

23. The method of claim 22 wherein the microporous diffuser comprises:
a first member having a plurality of microscopic openings;
an end cap to seal a first end of the microporous diffuser; and
a second member having a plurality of microscopic openings, with the first inlet port coupling to a first region of the microporous diffuser and the second inlet port coupling to a second region of the microporous diffuser defined by the second member to effect mixing of the first and second streams of gases within the first region of the microporous diffuser.

24. The method of claim 23 wherein the first and second members are cylinders and the second cylindrical member is disposed concentric to the first cylindrical member.

25. The method of claim 23 wherein the second member is one of a plurality of second members disposed through the first member.

26. The method of claim 22 further comprising:
disposing the microporous diffuser within a well.

27. The method of claim 26 wherein the microporous diffuser is disposed in the well at a depth that exceeds a depth that produces a back pressure on the ozone generator.

28. The method of claim 22 wherein microbubbles having a size in a range of 1 to 200 microns are emitted from the microporous diffuser.

29. The method of claim 22 wherein the microporous diffuser is disposed at a vertical depth in excess of 180 feet from the surface of the earth.

* * * * *